(12) United States Patent
Ishikawa et al.

(10) Patent No.: US 11,654,749 B2
(45) Date of Patent: May 23, 2023

(54) HEATER CONTROL DEVICE

(71) Applicant: DENSO CORPORATION, Kariya (JP)

(72) Inventors: Kimitake Ishikawa, Kariya (JP); Hideaki Kako, Kariya (JP); Hiroyasu Oide, Kariya (JP); Shiro Bando, Kariya (JP); Hidenori Arai, Kariya (JP)

(73) Assignee: DENSO CORPORATION, Kariya (JP)

( * ) Notice: Subject to any disclaimer, the term of this patent is extended or adjusted under 35 U.S.C. 154(b) by 1182 days.

(21) Appl. No.: 16/233,170

(22) Filed: Dec. 27, 2018

(65) Prior Publication Data

US 2019/0126723 A1    May 2, 2019

Related U.S. Application Data

(63) Continuation of application No. PCT/JP2017/019563, filed on May 25, 2017.

(30) Foreign Application Priority Data

Jul. 4, 2016 (JP) .............................. JP2016-132564

(51) Int. Cl.

| | |
|---|---|
| *B60H 1/22* | (2006.01) |
| *H05B 3/00* | (2006.01) |
| *H05B 3/12* | (2006.01) |
| *B60H 1/00* | (2006.01) |
| *H02H 9/02* | (2006.01) |

(52) U.S. Cl.
CPC ....... *B60H 1/2218* (2013.01); *B60H 1/00807* (2013.01); *B60H 1/22* (2013.01); *B60H 1/2226* (2019.05); *H02H 9/02* (2013.01); *H05B 3/00* (2013.01); *H05B 3/0023* (2013.01); *H05B 3/12* (2013.01)

(58) Field of Classification Search
CPC .... B60H 1/2218; B60H 1/00807; B60H 1/22; B60H 1/226; H02H 9/02; H05B 3/00; H05B 3/0023; H05B 3/12
See application file for complete search history.

(56) References Cited

U.S. PATENT DOCUMENTS

| | | | |
|---|---|---|---|
| 6,137,969 A | 10/2000 | Tsujimoto | |
| 9,527,390 B2 * | 12/2016 | Yamazaki | ............... B60L 58/21 |
| 2018/0106501 A1 * | 4/2018 | Hinton | .................. F24H 9/1818 |

FOREIGN PATENT DOCUMENTS

| | | | |
|---|---|---|---|
| JP | H07005791 A | | 1/1995 |
| JP | H11231713 A | | 8/1999 |
| JP | 2008249170 A | * | 10/2008 |
| JP | 2011257064 A | | 12/2011 |

(Continued)

*Primary Examiner* — Kun Kai Ma
(74) *Attorney, Agent, or Firm* — Harness, Dickey & Pierce, P.L.C.

(57) ABSTRACT

A heater control device controls an electric heater which includes a plurality of heat generating portions. The heater control device determines whether a total energization current value, which is a current value to be supplied to the electric heater when all of the plurality of heat generating portions are energizable, exceeds a predetermined current limit value. The heater control device is configured to, when it is determined that the total energization current value exceeds the current limit value, energize the electric heater while switching, among any or all of the plurality of heat generating portions, those to be turned to a non-energizable off state.

8 Claims, 8 Drawing Sheets

(56) References Cited

FOREIGN PATENT DOCUMENTS

| JP | 2014081424 A | | 5/2014 | |
|---|---|---|---|---|
| JP | 2016222185 A | * | 12/2016 | |
| WO | WO-2012100878 A1 | * | 8/2012 | ........... B60H 1/2218 |
| WO | WO-2015091598 A1 | * | 6/2015 | ......... B60H 1/00742 |

* cited by examiner

HEATER CONTROL DEVICE

CROSS REFERENCE TO RELATED APPLICATIONS

The present application is a continuation application of International Patent Application No. PCT/JP2017/019563 filed on May 25, 2017, which designated the United States and claims the benefit of priority from Japanese Patent Application No. 2016-132564 filed on Jul. 4, 2016. The entire disclosures of all of the above applications are incorporated herein by reference.

TECHNICAL FIELD

The present disclosure relates to a heater control device for controlling an electric heater.

BACKGROUND

An electric heater may include a plurality of heat generating portions. When controlling such an electric heater, it may be desirable to increase the amount of heat radiated from the electric heater while preventing an overcurrent situation from occurring.

SUMMARY

According to one aspect of the present disclosure, a heater control device controls an electric heater which includes a plurality of heat generating portions that generate heat when energized and which radiates the heat of the plurality of heat generating portions. In this exemplary aspect, the heater control device may include a current determination unit that determines whether or not a total energization current value, which is a current value to be supplied to the electric heater when all of the plurality of heat generating portions are energizable, exceeds a predetermined current limit value, and an energization control unit that, based on the determination of whether the total energization current value exceeds the current limit value, switches at least one of the heat generating portions between an energizable on state and a non-energizable off state.

DETAILED DESCRIPTION

Figure 1:
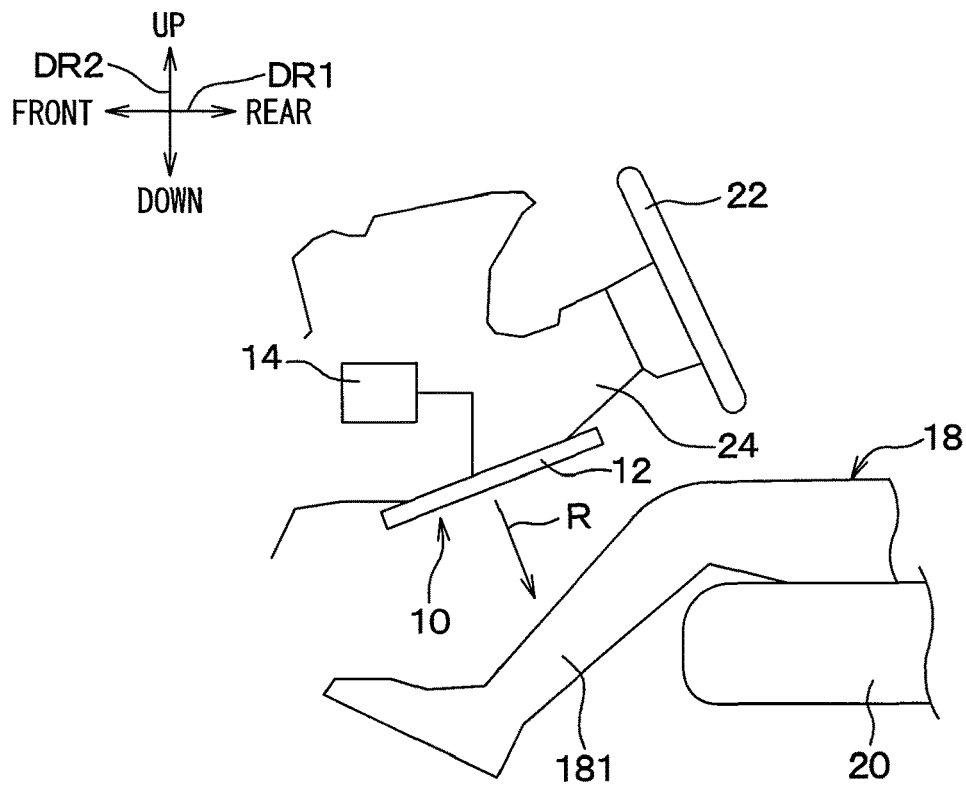
FIG. 1 is a schematic figure showing an electric heater provided in a vehicle and its surroundings.

Hereinafter, embodiments of the present disclosure will be described with reference to the drawings. In the following embodiments, identical or equivalent elements are denoted by the same reference numerals as each other in the figures.

First Embodiment

Figure 5:
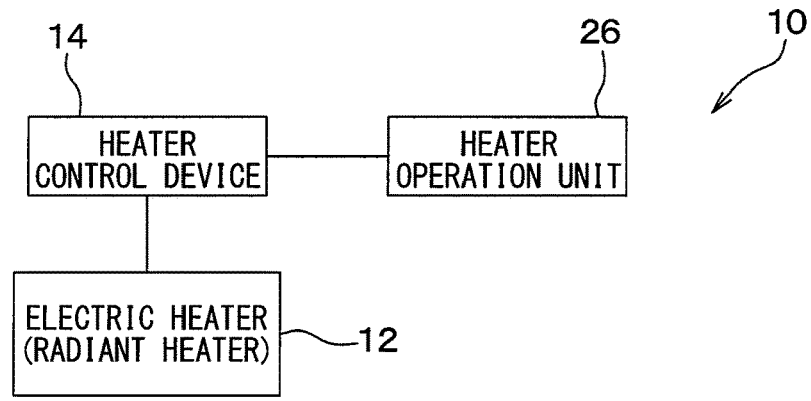
FIG. 5 is a functional block diagram including an electric heater, a heater control device, and a heater operation unit.

As shown in FIG. 1, in the present embodiment, a heater system 10 is mounted in a vehicle, and the heater system 10 includes an electric heater 12, a heater control device 14, and a heater operation unit 26 (see FIG. 5). Here, the arrows DR1 and DR2 in FIG. 1 indicate the directions of the vehicle in which the heater system 10 is mounted. In particular, the arrow DR1 in FIG. 1 represents a vehicle front-rear direction DR1, and the arrow DR2 represents a vehicle up-down direction DR2.

Figure 2:
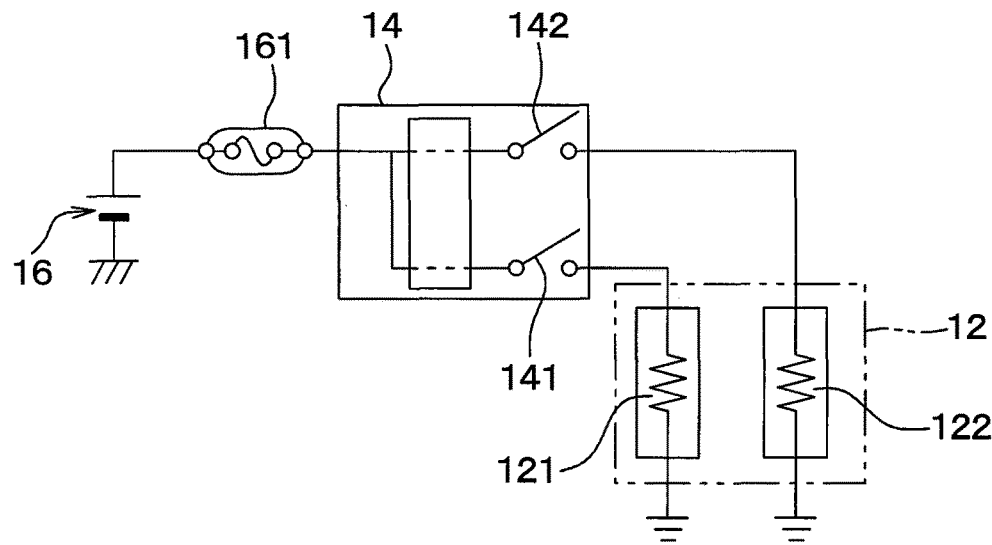
FIG. 2 is a figure showing an electrical schematic configuration of an electric heater and a heater control device.

The electric heater 12 is a radiation heater formed in a thin plate shape, and is disposed in the passenger compartment. As shown in FIGS. 1 and 2, the electric heater 12 generates heat by being supplied with power from a power supply 16 such as a battery or a generator mounted in the vehicle. More specifically, the electric heater 12 has a plurality of heat generating portions 121, 122 that generate heat when energized. The electric heater 12 radiates the heat of the plurality of heat generating portions 121, 122. The electric heater 12 can be used as an device for providing immediate warmth to an occupant 18. In FIG. 1, the radiant heat emitted from the electric heater 12 is schematically shown as an arrow R.

Specifically, the electric heater 12 is installed at a position facing a lower leg 181 of the occupant 18 having a normal posture, assuming the occupant 18 is seated on a seat 20. That is, the electric heater 12 is installed on the lower side of a steering column 24 for supporting a steering wheel 22. With this arrangement, the electric heater 12 radiates radiant heat to the occupant 18 as indicated by the arrow R.

As shown in FIG. 2, the plurality of heat generating portions 121, 122 are connected in parallel to each other and are connected to the power supply 16. That is, a first heat generating portion 121 of the plurality of heat generating portions 121, 122 is included in an electrical system provided in parallel to an electrical system including a second heat generating portion 122 of the plurality of heat generating portions 121, 122. In short, the electric heater 12 includes, electrically, a plurality of systems of heat generating portions 121, 122.

Further, the heater control device 14 is disposed between the power supply 16 and the heat generating portions 121, 122. The heater control device 14 includes switch circuits 141, 142 capable of independently driving the heat generating portions 121, 122.

Specifically, the first switch circuit 141 of the switch circuits 141, 142 of the heater control device 14 is connected in series to the first heat generating portion 121, and switches the first heat generating portion 121 on and off. Further, the second switch circuit 142 of the switch circuits 141, 142 of the heater control device 14 is connected in series to the second heat generating portion 122, and switches the second heat generating portion 122 on and off. The switch circuits 141 and 142 may be, for example, electric relays, MOS, semiconductor relays, or switches that mechanically open and close.

Further, a current interrupting circuit 161 for protecting vehicle circuits is disposed between the power supply 16 and the heater control device 14. Although the current interrupting circuit 161 of the present embodiment is a fuse, a fusible link, a circuit breaker, or the like may be used instead as well.

Since the electric heater 12 includes the first heat generating portion 121 and the second heat generating portion 122 as described above, a heater temperature TPh, which is the temperature of the electric heater 12, may be regarded as the temperature of each of the heat generating portions 121, 122. Both the first heat generating portion 121 and the second heat generating portion 122 has the temperature characteristics shown in FIG. 3. That is, the electric resistance of the first heat generating portion 121 increases as the heater temperature TPh increases. Similarly, the electric resistance of the second heat generating portion 122 increases as the heater temperature TPh increases.

Figure 3:
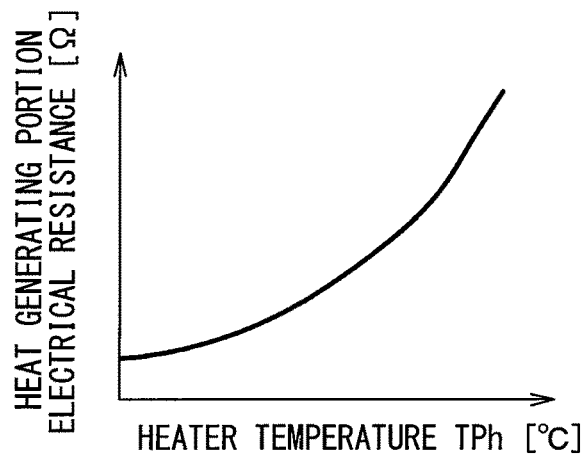
FIG. 3 is a figure showing resistance-temperature characteristics of a first heat generating portion and a second heat generating portion.
Figure 4:
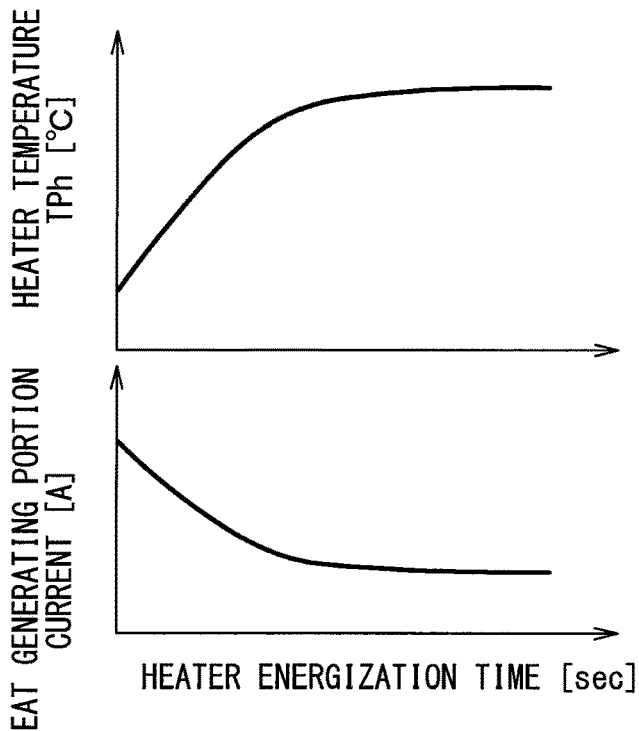
FIG. 4 is a time chart showing change over time in a heater temperature and change over time in a current value of each heat generating portion from the start of energization of an electric heater.

For this reason, for example as shown in FIG. 4, when energization of the heat generating portions 121, 122 (that is, energization to the electric heater 12) is started, due to Joule heating by each heat generating portion 121, 122, the heater temperature TPh increases over time. Further, due to the temperature characteristics of FIG. 3, the electric resistance value of each of the heat generating portions 121, 122 increases as the heater temperature TPh increases. As a result, the longer an energization period is, the more the current value of each of the heat generating portions 121, 122 decreases. The energization period is measured from the start timing of the energization. Further, in the time chart of FIG. 4, the voltage of the power supply 16 is constant.

As shown in FIGS. 1 and 5, the heater control device 14 is a control device that controls the electric heater 12. The heater control device 14 includes a microcontroller having a CPU, a ROM, a RAM, and the like (not illustrated). Signal from sensors or the like connected to the heater control device 14 undergo A/D conversion by an input circuit (not illustrated), and are then input to the microcontroller of the heater control device 14.

For example, the heater control device 14 is connected to the heater operation unit 26 provided in the passenger compartment, and signals from the heater operation unit 26 are input to the heater control device 14. The heater operation unit 26 is an operation unit operated by the occupant 18. That is, the heater operating unit 26 is configured to include a heater operation switch which the occupant 18 can operate to selectively switch between operation and non-operation of the electric heater 12.

This heater operation switch is a switch that can be switched to a heater on position or a heater off position, and is provided at a position in the passenger compartment where the occupant is able to easily operate the heater operation switch. In order to energize the electric heater 12 to cause the electric heater 12 to operate, the occupant 18 would position the heater operation switch in the heater on position. Further, in order to deenergize the electric heater 12 to stop the electric heater 12, the occupant 18 would position the heater operation switch in the heater off position.

Then, the heater control device 14 drives and controls the electric heater 12 based on the signal transmitted from the heater operation switch of the heater operation unit 26. For example, when receiving a signal indicating that the heater operation switch is switched to the heater on position from the heater operation unit 26, the heater control device 14 executes energization of the electric heater 12. That is, the electric heater 12 is turned on.

In addition, when receiving a signal indicating that the heater operation switch is switched to the heater off position from the heater operation unit 26, the heater control device 14 stops energization of the electric heater 12. That is, the electric heater 12 is turned off.

For example, regardless of whether a first heater control or a second heater control is being executed in the control processing of FIG. 6, which is described later, if the heater operation switch is switched to the heater off position, the heater control device 14 stops energization of the electric heater 12.

Figure 6:
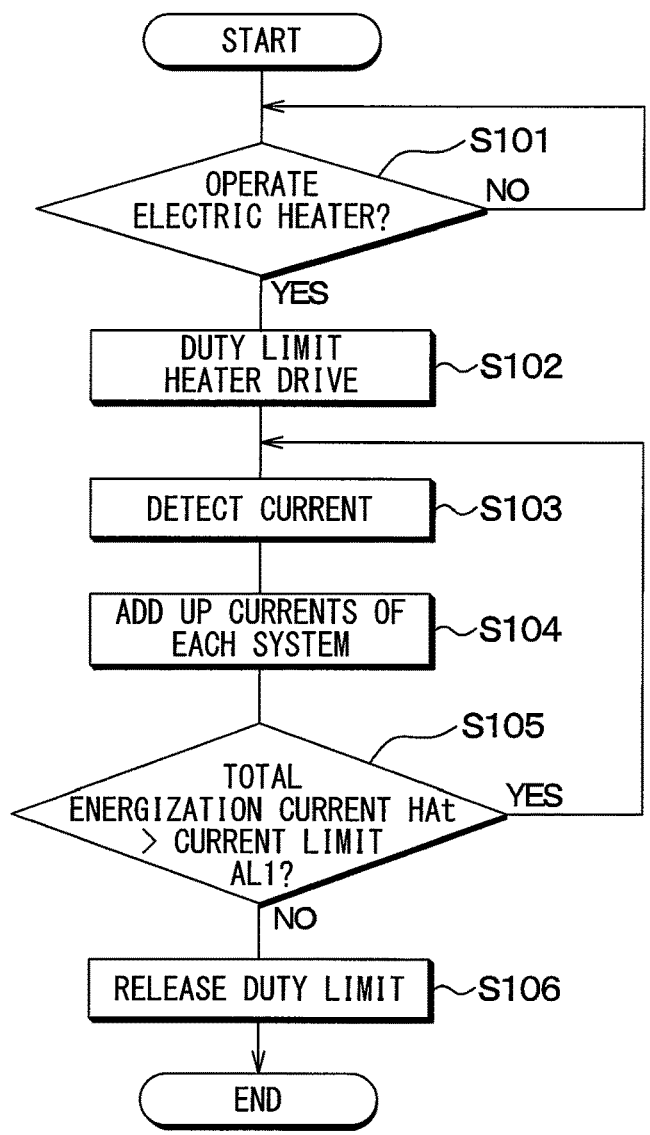
FIG. 6 is a flowchart showing a control process executed by a heater control device.

More specifically, the heater control device 14 executes the control process shown in FIG. 6. For example, when the ignition switch of the vehicle is turned on, the heater control device 14 starts the control process of FIG. 6.

As shown in FIG. 6, in step S101, the heater control device 14 first acquires a signal from the heater operation unit 26. Then, it is determined whether or not to operate the electric heater 12. The heater control device 14 determines whether or not to operate the electric heater 12 based on an occupant operating the heater operation unit 26. Accordingly, when the heater operation switch is switched to the heater on position, the heater control device 14 determines that the electric heater 12 is to be operated. On the other hand, when the heater operation switch is switched to the heater off position, the heater control device 14 determines that the electric heater 12 is to be stopped.

When it is determined in step S101 that the heater control device 14 should operate the electric heater 12, i.e., when it is determined that the heater operation switch of the heater operation unit 26 is switched to the heater on position, the process continues to step S102.

conversely, when it is determined that the heater control device 14 should stop the electric heater 12, i.e., when it is determined that the heater operation switch is switched to the heater off position, the processing of step S101 is repeated. That is, in this case, the heater control device 14 turns off both of the switch circuits 141, 142 in FIG. 2 to maintain the electric heater 12 in a de-energized state.

Figure 7:
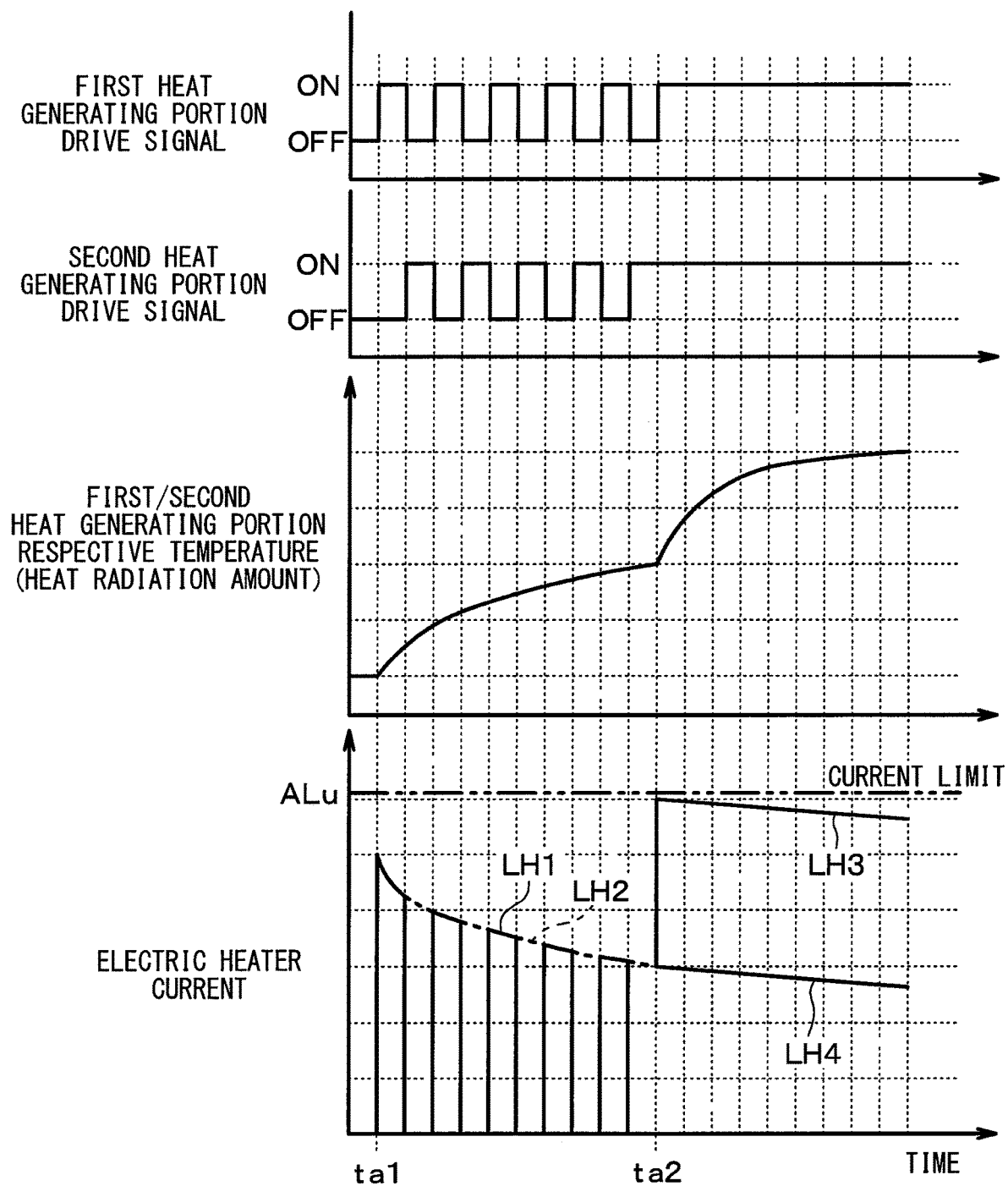
FIG. 7 is a time chart showing change over time in each of an operating state of each heat generating portion, a temperature of each heat generating portion, and a current value of an electric heater, when the control process of FIG. 6 is executed.

In FIG. 7, at time ta1, the determination at step S101 is switched to the determination to operate the electric heater 12. As a result, a first heater control, which is described later, is started at step S102 in FIG. 6.

In step S102 of FIG. 6, the heater control device 14 drives the electric heater 12 subjected to duty limit. In other words, the heater control device 14 alternately turns on and off the drive signals of the heat generating portions 121, 122 for the switch circuits 141, 142 as shown between time points ta1 and ta2 in FIG. 7. In short, the heater control device 14 executes a first heater control which alternately energizes the first heat generating portion 121 and the second heat generating portion 122. This first heater control is continued until a second heater control is started in step S106. Further, the voltages applied to the plurality of heat generating portions 121, 122 are equal to the voltage of the power supply 16 when their drive signal is on, and are zero when their drive signal is off.

In FIG. 7, since the first heater control is started from the point of time ta1, the temperature of the heat generating portions 121, 122, that is, the heater temperature TPh increases with the lapse of time. As the temperature of the heat generating portions 121, 122 rises, the heat radiation amount of the heat generating portions 121, 122 also increases. Furthermore, as the heater temperature TPh rises, the electric resistances of the heat generating portions 121, 122 also increase due to the temperature characteristics of the heat generating portions 121, 122. Therefore, the current value of the electric heater 12 gradually decreases with the lapse of time. For example, in the example of FIG. 7, the voltage of the power supply 16 is maintained at a constant value, or maintained within a predetermined range that can be regarded as a constant voltage.

Due to the execution of the first heater control, the current value of the electric heater 12 is reduced as compared with the case where the first heat generating portion 121 and the second heat generating portion 122 are energized at the same time. For example, in the present embodiment, since the first heat generating portion 121 and the second heat generating portion 122 are identical to each other, the current value of the electric heater 12 is approximately half as much as when the first heat generating portion 121 and the second heat generating portion 122 are energized simultaneously. As a result of the reduction in the current value of the electric heater 12 as described above, the current value of the electric heater 12 is equal to or less than a predetermined current upper limit ALu.

Specifically, the current value of the electric heater 12 is the current value of the current flowing through the entirety of the first heat generating portion 121 and the second heat generating portion 122. Further, the current upper limit ALu is a current value over which the current interrupting circuit 161 cuts off the connection between the electric heater 12 and the power supply 16. As such, if the current value of the electric heater 12 is equal to or less than the current upper limit ALu, the current interrupting circuit 161 is kept energized. If the current value of the electric heater 12 exceeds the current upper limit ALu, the current interrupting circuit 161 becomes non-energizable.

Further, during the period from ta1 to ta2 in FIG. 7, the current value of the first heat generating portion 121 is indicated by a solid line LH1 and the current value of the second heat generating portion 122 is indicated by a dashed line LH2. In addition, since the first heat generating portion 121 and the second heat generating portion 122 are alternately turned on and off, the current value of the electric heater 12 is equal to the current value of whichever one of the first and second heat generating portions 121, 122 which is in the on state, i.e., capable of being energized. In FIG. 6, the process continues to step S103 after step S102.

In step S103, the heater control device 14 detects the current value of each of the heat generating portions 121, 122 during energization in order to estimate a total energization current value HAt of the electric heater 12.

The total energization current value HAt is the current that would be supplied to the electric heater 12 if voltage is applied to the plurality of heat generating portions 121, 122 in a predetermined unrestricted state. The predetermined unrestricted state is a predetermined state in which the voltage of the power supply 16 is continuously applied, and without being limited, to each of the plurality of heat generating portions 121, 122. Accordingly, in the present embodiment, the total energization current value HAt is the current that would be supplied to the electric heater 12 if all of the plurality of heat generating portions 121, 122 are able to be energized. Further, in the present embodiment, the voltage applied to each of the heat generating portions 121, 122 is equal to the voltage of the power supply 16, i.e., the power source voltage, if the heat generating portions 121, 122 can be energized.

For example, a current sensor (not illustrated) is provided for each of the heat generating portions 121, 122. Then, detection signals representing the current value of each of the heat generating portions 121, 122 detected by these current sensors are transmitted from these current sensors to the heater control device 14.

Here, during execution of the first heater control, as described above, the first heat generating portion 121 and the second heat generating portion 122 are alternately turned on and off. As a result, the timings at which the energization takes place are different between the first heat generating portion 121 and the second heat generating portion 122. That is, during the processing of step S103, one of the first heat generating portion 121 and the second heat generating portion 122 is in a non-energizable OFF state. Therefore, for the one of the first and second heat generating portions 121, 122 which is in the non-energizable OFF state during the processing of step S103, the heater control device 14 uses the current value of that heat generating portion prior to the OFF state as a current value for estimating the total energization current value HAt. Conversely, the current value of the heat generating portion in the energizable ON state is directly detected at the time of the processing of step S103.

It should be noted that, immediately after step S103, step S105 which is described later is executed, and in step S105 it is determined whether or not the total energization current value HAt exceeds a current limit value AL1. Therefore, the phrase "during the processing of step S103" described above may be rephrased as "at the time of determining whether or not the total energization current value HAt exceeds the current limit value AL1". In FIG. 6, the process continues to step S104 after step S103.

In step S104, the heater control device 14 adds up the current value of each electric system in the electric heater 12. In other words, the heater control device 14 estimates the total energization current value HAt by adding up the current values detected during the energization of the plurality of heat generating portions 121, 122, i.e., the current value of each heat generating portion 121, 122 obtained in step S103. To put it briefly, the heater control device 14 calculates the total energization current value HAt as the sum of the current values of each of the heat generating portions 121, 122 obtained in the step S103. After step S104, the process proceeds to step S105.

In step S105, the heater control device 14 determines whether or not the total energization current value HAt of the electric heater 12 exceeds the predetermined current limit value AL1. The current limit value AL1 is a value set such that the current value of the electric heater 12 does not exceed the current upper limit ALu of the current interrupting circuit 161. Therefore, in the present embodiment, the current limit value AL1 is equal to the current upper limit ALu. However, alternatively, the current limit value AL1 may be smaller than the current upper limit ALu as well.

In step S105, if it is determined that the total energization current value HAt exceeds the current limit value AL1, the process proceeds to step S103. In this step S103, execution of the first heater control is continued. As such, the first heater control is a control executed when the total energization current value HAt exceeds the current limit value AL1. Then, during execution of the first heater control, the first heat generating portion 121 and the second heat generating portion 122 are energized while the voltage applied to the first heat generating portion 121 and the second heat generating portion 122 are limited as compared to the above described unrestricted state.

Conversely, if it is determined that the total energization current value HAt is equal to or less than the current limit value AL1, the process proceeds to step S106. In FIG. 7, the time point ta2 shows the point in time at which the opposite determination is made at step S105 and the second heater control, which is described later, is started in step S106 of FIG. 6.

In step S106 of FIG. 6, the heater control device 14 releases the duty limit and continues to drive the electric heater 12. In other words, the heater control device 14 sets the drive signals of the heat generating portions 121, 122 for the switch circuits 141, 142 to be continuously on, as shown after time point ta2 in FIG. 7. As such, the heater control device 14 executes the second heater control which energizes the electric heater 12 in a state where all of the plurality of heat generating portions 121, 122 of the electric heater 12 and energizable. In other words, in this second heater control, the limiting of the voltage applied to the heat generating portions 121, 122 for the first heater control is released, and the power supply voltage is applied to each of the heat generating portions 121, 122 in the above described unrestricted state.

According to the determination contents of the above step S105, this second heater control is a control executed when the total energization current value HAt is equal to or less than the current limit value AL1.

In FIG. 7 at time point ta2, the energization control for energizing the electric heater 12 is switched from the first heater control to the second heater control. Accordingly, the current value of the electric heater 12 increases stepwise at time ta2. After time point ta2 in FIG. 7, the current value of the electric heater 12, which is the sum of the current values of the first and second heat generating portions 121, 122, is indicated by a solid line LH3. Further, the current value of each of the first and second heat generating portions 121, 122 is indicated by a solid line LH4.

Further, in FIG. 7, since the current value of the electric heater 12 increases to the border at the time ta2, along with this, the slope at which the heater temperature TPh rises also increases. As a result, when switching from the first heater control to the second heater control, the heater temperature TPh rises to a higher temperature as compared to the case where the first heater control is continued.

In addition, as can be seen from the fact that the heater temperature TPh after the time ta2 is higher than before the time ta2, it can be said that the heater control device 14 can control the electric heater 12 to a higher temperature when executing the second heater control as compared to when executing the first heater control.

In addition, since the second heater control is executed after it is determined that the total energization current value HAt is equal to or less than the current limit value AL1, the current value of the electric heater 12 indicated by the solid line LH3 does not exceed the current upper limit ALu.

This second heater control is continued until the electric heater 12 is turned off, for example, by switching the heater operation switch or an ignition switch. Then, once the electric heater 12 is turned off, the control process in FIG. 6 starts from step S101.

Note that the processing in each step of FIG. 6 described above constitutes a functional unit that implements its respective functions. This also applies to the flowcharts of FIGS. 9 and 11 to be described later. Further, steps S102 and S106 in FIG. 6 correspond to an energization control unit, and steps S103, S104, and S105 correspond to a current determination unit.

As described above, according to the present embodiment, as shown in FIG. 6 and FIG. 7, the first heater control, in which the first heat generating portion 121 and the second heat generating portion 122 are alternately energized, is performed under the condition that the total energization current value HAt of the electric heater 12 exceeds the current limit value AL1. That is, by appropriately shifting the energization timings of individual heat generating portions 121, 122, the current value of the electric heater 12 may be limited to being equal to or less than the current limit value AL1. Conversely, under the condition that the total energization current value HAt is equal to or less than the current limit value AL1, the second heater control is performed in which the electric heater 12 is energized while all heat generating portions 121, 122 are energizable. As a result, the heat radiation amount of the electric heater 12 is increased as compared with when executing the first heater control.

Accordingly, it is possible to energize the electric heater 12 under the condition that the magnitude of the current of the electric heater 12 is limited by the current upper limit ALu, while also increasing the heat radiation amount of the electric heater 12 as compared with the case where the first heater control is continuously executed.

Figure 8:
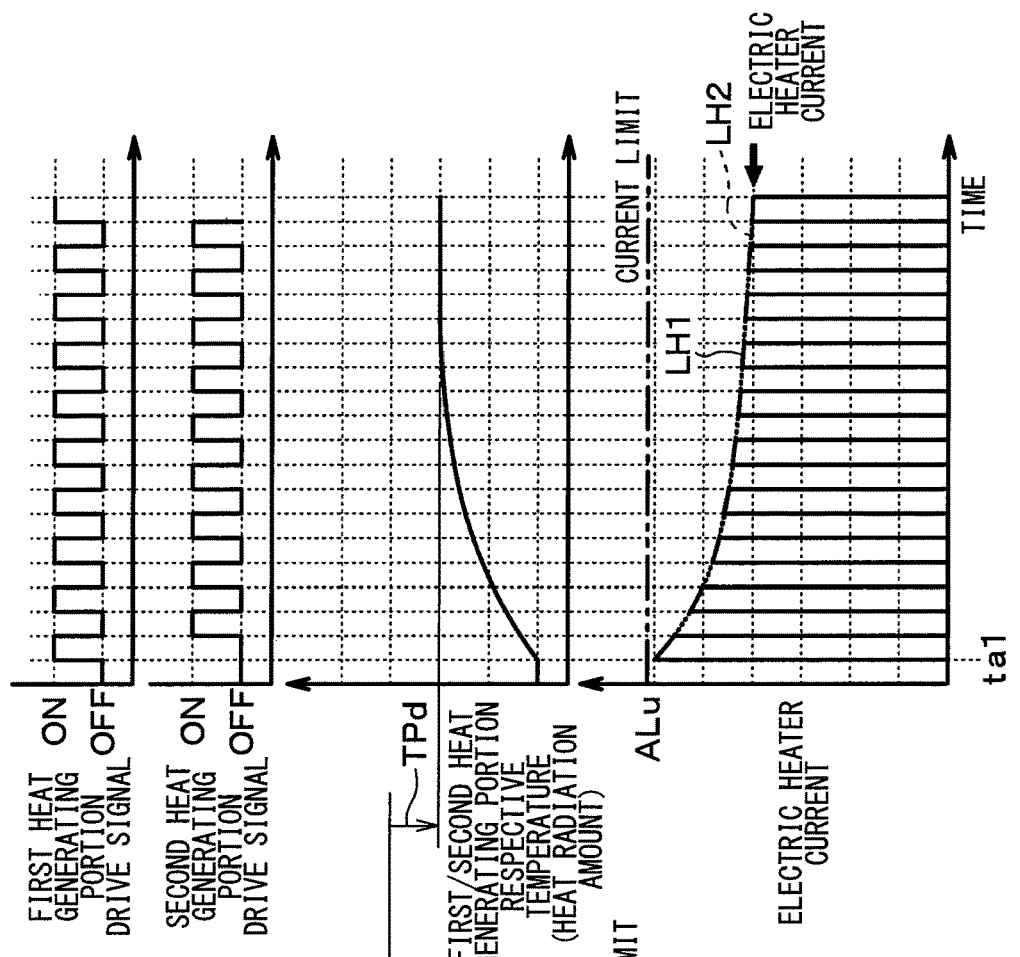
FIG. 8 is (a) a time chart showing change over time in each of an operating state of each heat generating portion, a temperature of each heat generating portion, and a current value of an electric heater in a first comparative example, and (b) a time chart showing change over time in each of an operating state of each heat generating portion, a temperature of each heat generating portion, and a current value of an electric heater in a second comparative example.
Figure 8:
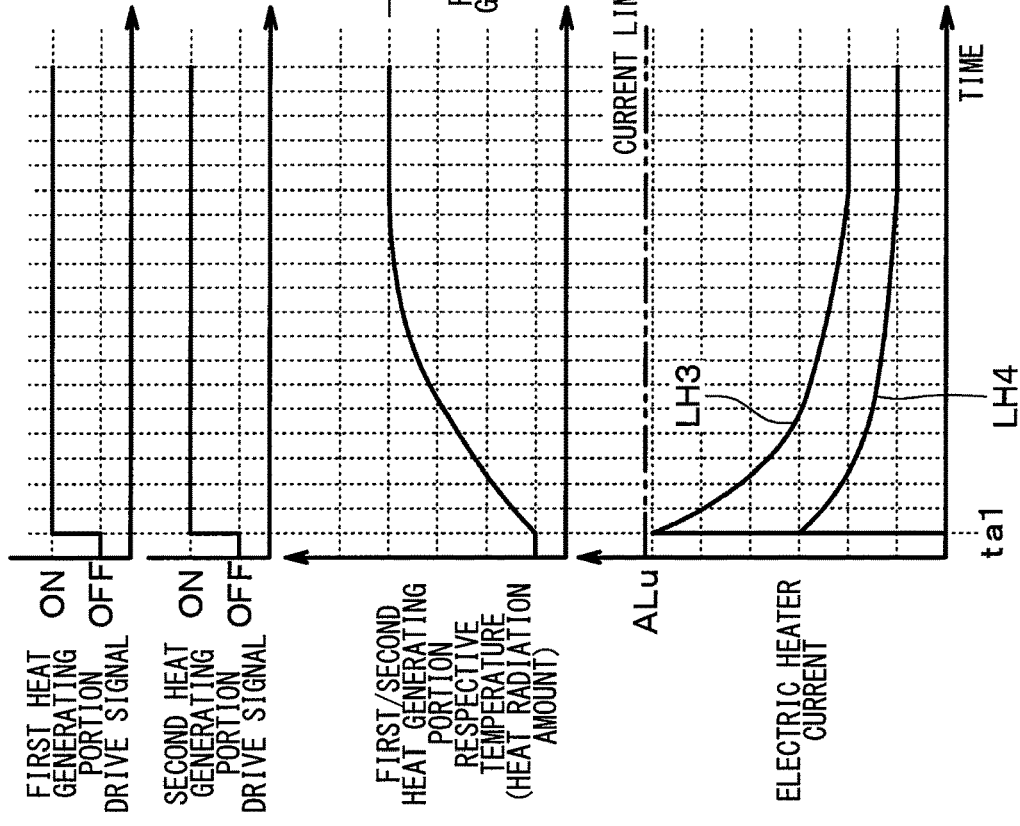

This will be described in detail using a first comparative example and a second comparative example. In the first comparative example and the second comparative example as well, as shown in FIGS. 8(a) and (b), the condition that the magnitude of the electric current of the electric heater 12 is limited by the current upper limit ALu also applies. Further, FIG. 8(a) is a time chart of the first comparative example, and FIG. 8(b) is a time chart of the second comparative example. In addition, the time ta1 in FIG. 8(a), (b) is the same as the time point ta1 of FIG. 7, i.e., the time point when the heater operation switch is switched from the heater off position to the heater on position. In addition, in each of the first comparative example and the second comparative example, each of the heat generating portions 121, 122 has the same temperature characteristic as that of the present embodiment shown in FIG. 3.

In the first comparative example, as shown in FIG. 8(a), there is no duty limiting of the energization of each of the heat generating portions 121, 122. Instead, the energization to the first heat generating portion 121 and the second heat generating portion 122 is continued after time ta1. However, since the current value of the electric heater 12 is limited to the current upper limit ALu or less, in the first comparative example, each of the heat generating portions 121, 122 is a heat generating portion having a lower power consumption, i.e., lower current load, than those of the present embodiment. For example, in the first comparative example, the heater surface area of the electric heater 12 which emits heat may be smaller than that of the present embodiment, so that the current load on each of the heat generating portions 121, 122 is reduced.

For this reason, in the first comparative example, since the heater temperature TPh corresponding to the temperature of each of the heat generating portions 121, 122 increases without duty limit. Accordingly, the heater temperature TPh of the first comparative example rises to the same level as the heater temperature TPh when the second heater control is executed in the present embodiment. That is, in the first comparative example, the heater temperature TPh rises to a predetermined temperature at which the heat generation performance of the electric heater 12 is sufficient.

However, in the first comparative example, as described above, the heat generating portions 121, 122 of the electric heater 12 are heat generating portions with lower current loads. Accordingly, when the heater temperature TPh reaches a predetermined temperature, the current value of the electric heater 12 decreases to a value greatly lower than the current upper limit ALu. Therefore, in the electric heater 12 of the first comparative example, when energization is continued, it is not possible to obtain a sufficient amount of heat radiation corresponding to the current upper limit ALu.

Meanwhile, in the second comparative example, heat generating portions having a small current load, such as those of the first comparative example, are not used. Instead, the electric heater 12 of the second comparative example is the same as that of the present embodiment. However, as shown in FIG. 8(b), duty limit is applied to the energization of each of the heat generating portions 121, 122. That is, in the second comparative example, similarly to the first heater control of the present embodiment, the first heat generating portion 121 and the second heat generating portion 122 are alternately energized. Then, during the operation of the electric heater 12, the alternate energization of the first heat generating portion 121 and the second heat generating portion 122 is continued indefinitely.

For this reason, in the second comparative example, the instantaneous electric current value of the electric heater 12 is equal to the current value of one of the first heat generating portion 121 and the second heat generating portion 122, similar to during the execution of the first heater control of the present embodiment, and it is possible to energize a wide heater surface area. However, as indicated by the arrow TPd in FIG. 8(b), there is a possibility that the heater temperature TPh does not reach a predetermined temperature at which the heat generation performance of the electric heater 12 is sufficiently exhibited. In other words, while it may be possible to prevent the current value of the electric heater from exceeding the current upper limit value by appropriately shifting the energization timings of the individual heat generating portions, an energizing period during which each heat generating portion is energized is limited. As a result, the amount of heat that the electric heater can emit is limited. Therefore, in the electric heater 12 of the second comparative example as well, when energization is continued, it is not possible to obtain a sufficient amount of heat radiation corresponding to the current upper limit ALu.

In contrast, in the present embodiment, the second heater control is executed based on the determination that the total energization current value HAt is equal to or less than the current limit value AL1. Accordingly, even if the energization of the electric heater 12 is continued, it is possible to obtain a sufficient amount of heat radiation corresponding to the current upper limit ALu.

Further, according to the present embodiment, as shown in FIG. 3, the electric resistance of the plurality of heat generating portions 121, 122 of the electric heater 12 increases as the electric heater 12 increases in temperature. Further, as shown in FIGS. 6 and 7, the heater control device 14 executes the second heater control when the electric heater 12 is at a high temperature as compared with the case of executing the first heater control. Accordingly, when the electric heater 12 is energized, the second heater control is executed after the electric resistance of the heat generating portions 121, 122 is increased due to the heat generated by the plurality of heat generating portions 121, 122 themselves. Accordingly, the current of the electric heater 12 can be appropriately regulated to be equal to or less than the current upper limit ALu.

Further, according to the present embodiment, as shown in FIG. 6, the heater control device 14 estimates the total energization current value HAt by adding up the current values detected during the energization of the plurality of heat generating portions 121, 122. Therefore, by detecting the current value of each of the heat generating portions 121, 122, it is possible to easily estimate the total energization current value HAt.

Further, according to the present embodiment, for the one of the heat generating portions 121, 122 which is in the OFF state when it is being determined whether or not the total energization current value HAt exceeds the current limit value AL, the heater control device 14 uses the current value of that heat generating portion prior to the OFF state as a current value for estimating the total energization current value HAt. Therefore, during the execution of the first heater control, it is possible to estimate the total energization current value HAt without needing to switch on the heat generating portion that is in the OFF state when it is being determined whether or not the total energization current value HAt exceeds the current limit value AL.

Second Embodiment

A second embodiment of the present disclosure is described next. The present embodiment will be explained primarily with respect to portions different from those of the first embodiment. In addition, explanations of the same or equivalent portions as those in the above embodiment will be omitted or simplified. This also applies to embodiments to be described later.

Figure 9:
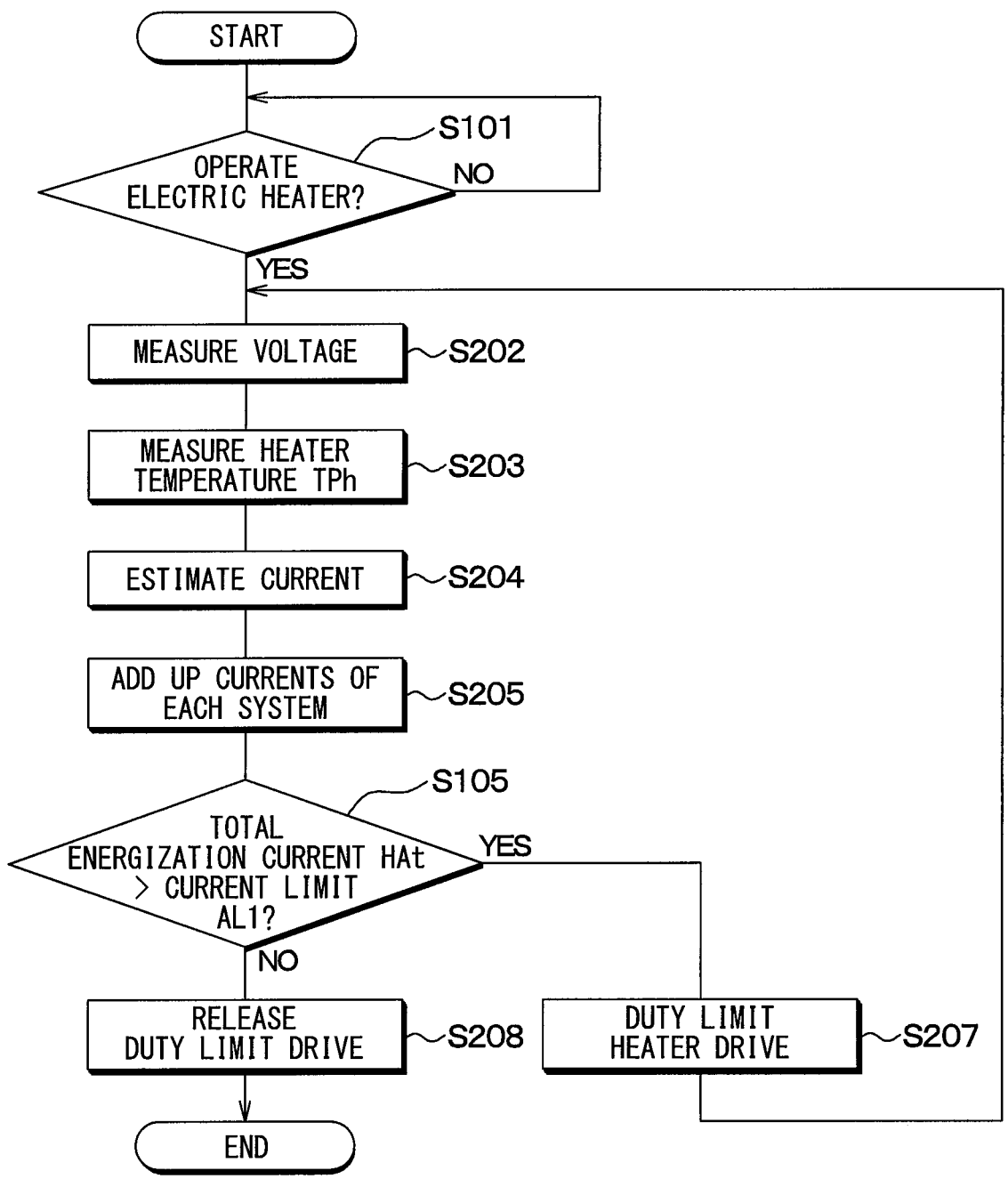
FIG. 9 is a flowchart showing a control process executed by a heater control device, and corresponds to FIG. 6.

In the present embodiment, as shown in FIG. 9, the heater control device 14 controls the electric heater 12 in the same way as in the first embodiment, but the specific control process executed by the heater control device 14 is different from that of the first embodiment. That is, the heater control device 14 of the present embodiment executes the control process shown in FIG. 9 instead of the control process shown in FIG. 6 of the first embodiment.

Specifically, as in the first embodiment, the heater control device 14 of the present embodiment starts the control process of FIG. 9 when, for example, the ignition switch of the vehicle is turned on.

Step S101 of the present embodiment shown in FIG. 9 is the same as step S101 of the first embodiment.

In step S101 of FIG. 9, when the heater control device 14 determines that the electric heater 12 is to be operated, the process continues to step S202. Conversely, if the heater control device 14 determines that the electric heater 12 should be stopped, the processing of step S101 is repeated.

In step S202, the heater control device 14 measures an applied voltage to each heat generating portions 121, 122. In other words, this applied voltage is detected. For example, a voltage sensor (not illustrated) is provided in the power supply 16, and a detection signal representing a power supply voltage, which is a voltage between the terminals of the power supply 16, detected by the voltage sensor is transmitted from the voltage sensor to the heater control device 14. Then, the heater control device 14 detects the power supply voltage as the applied voltage of each of the heat generating portions 121, 122. After step S202, the process continues to step S203.

In step S203, the heater control device 14 measures the heater temperature TPh. In other words, the heater temperature TPh is detected. For example, a heater temperature sensor (not illustrated) is provided in the electric heater 12, and a detection signal representing the heater temperature TPh detected by the heater temperature sensor is transmitted from the heater temperature sensor to the heater control device 14. After step S203, the process continues to step S204.

In step S204, the heater control device 14 estimates the current value of each heat generating portion 121, 122. Here, similar to the first embodiment, each of the heat generating portions 121, 122 has the temperature characteristic shown in FIG. 3 described above. Therefore, in order to estimate the current value of each of the heat generating portions 121, 122, the heater control device 14 stores the temperature characteristic of FIG. 3 as a resistance-temperature map, i.e., a predetermined relationship between the heater temperature TPh and the electric resistance of the heat generating portions 121, 122.

Then, the heater control device 14 obtains the electric resistance of each of the heat generating portions 121, 122 from the resistance-temperature map, and based on this electric resistance and the applied voltage of each of the heat generating portions 121, 122 obtained in step S202, the heater control device 14 calculates the current value of each of the heat generating portions 121, 122. In FIG. 9, the process continues to step S205 after step S204.

In step S205, the heater control device 14 estimates the total energization current value HAt in the same manner as in step S104 of FIG. 6. In other words, the heater control device 14 calculates the total energization current value HAt as the sum of the current values of each of the heat generating portions 121, 122 obtained in step S204 of FIG. 9.

Since the estimation of the total energization current value HAt is performed through steps S202 to S204 in this manner, that is, the heater control device 14 estimates the total energization current value HAt based on the applied voltage of each heat generating portion 121, 122 and the heater temperature TPh from the above described resistance-temperature map. In FIG. 9, the process continues to step S105 after step S205.

Step S105 of FIG. 9 is the same as step S105 of the first embodiment shown in FIG. 6.

In step S105 of FIG. 9, if it is determined that the total energization current value HAt exceeds the current limit value AL1, the process continues to step S207. Conversely, if it is determined that the total energization current value HAt is equal to or less than the current limit value AL1, the process continues to step S208.

The time chart of FIG. 7 is the same in the present embodiment, and the time point at which the above-described first heater control is started at step S207 of FIG. 9 due to the determination at step S105 is shown as the time point ta1. Further, in FIG. 7, the time point ta2 shows the point in time at which the opposite determination is made at step S105 and the above described second heater control is started in step S208 of FIG. 9.

In step S207 of FIG. 9, the heater control device 14 drives the duty limited electric heater 12 as in step S102 of FIG. 6. That is, the heater control device 14 executes the above-described first heater control. Further, if the first heater control is already being executed, execution of the first heater control is continued. This first heater control is continued until the above-described second heater control is started in step S208 of FIG. 9. In FIG. 9, after step S207, the process continues to step S202.

In step S208, the heater control device 14 releases the duty limit and continues to drive the electric heater 12 as in step S106 of FIG. 6. That is, the heater control device 14 executes the above-described second heater control. Further, if the second heater control is already being executed, execution of the second heater control is continued.

Further, similar to the first embodiment, in the present embodiment as well, this second heater control is continued until the electric heater 12 is turned off, for example, by switching the heater operation switch or an ignition switch. Then, once the electric heater 12 is turned off, the control process in FIG. 9 starts from step S101.

Note that steps S207 and S208 in FIG. 9 correspond to the energization control unit, and steps S202, S203, S204, S205, and S105 in FIG. 9 correspond to the current determination unit.

Aside from the above described aspects, the present embodiment is the same as the first embodiment. Further, in the present embodiment, effects similar to those of the first embodiment described above can be obtained in the same manner as in the first embodiment.

Further, according to the present embodiment, as shown in FIG. 9, the heater control device 14 estimates the total energization current value HAt based on the heater temperature TPh and the applied voltage of each heat generating portion 121, 122. Therefore, even when changes in the heater temperature TPh affects the current value of each heat generating portion 121, 122, and even when changes in the applied voltage of each heat generating portion 121, 122 affects the current value of each heat generating portion 121, 122, it is possible to appropriately estimate the total energization current value HAt.

For example, since the total energization current value HAt is estimated based on the applied voltage of the heat generating portions 121, 122, even if the power supply voltage fluctuates according to the state of charge of the power supply 16 or the like, it is possible to appropriately estimate the total energization current value HAt.

Third Embodiment

A third embodiment is described next. The present embodiment will be explained primarily with respect to portions different from those of the second embodiment.

Figure 10:
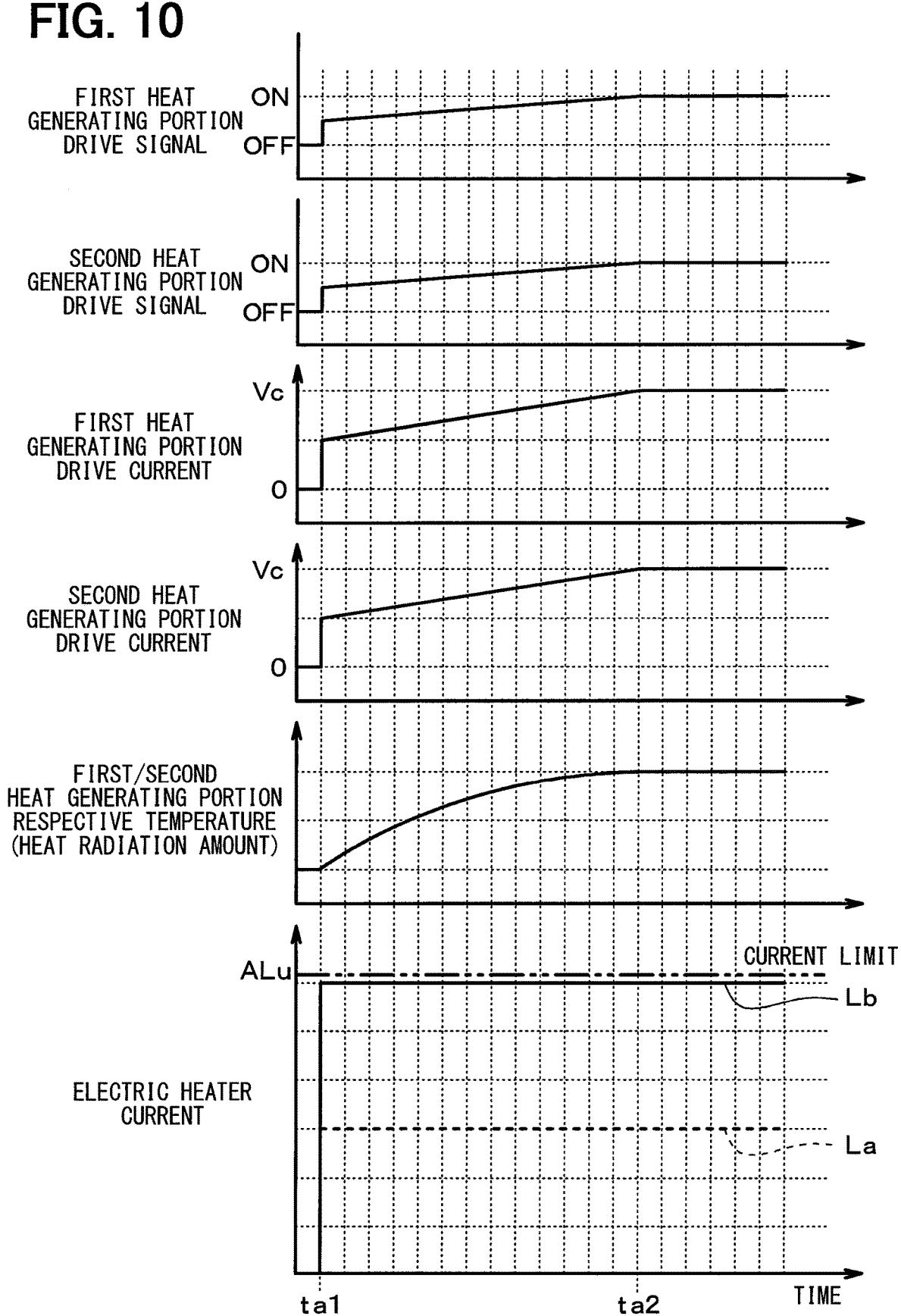
FIG. 10 is a time chart showing change over time in each of an operating state of each heat generating portion, a temperature of each heat generating portion, and a current value of an electric heater, when a control process is executed by a heater control device, and corresponds to FIG. 7.

In the present embodiment, as the power supply 16 in FIG. 2, a variable voltage power supply in which the power supply voltage is capable of being steplessly changed is used. Further, the heater control device 14 continuously changes the power supply voltage which is the output voltage of the power supply 16. Specifically, as shown in FIG. 10, the heater control device 14 changes the power supply voltage within a range from 0V to a predetermined steady voltage Vc. The steady voltage Vc is a voltage which is continuously maintained as the power supply voltage after saturation of the heater temperature TPh. The steady voltage Vc is experimentally determined in advance such that, after saturation of the heater temperature TPh, the current value of the electric heater 12 can be maintained at a value which is close to the current upper limit ALu while also being equal to or less than the current upper limit ALu.

Further, in the present embodiment, when the heater control device 14 sets the power supply voltage to 0V, the first heat generating portion 121 and the second heat generating portion 122 are turned off. Accordingly, in the present embodiment, the first switch circuit 141 and the second switch circuit 142 (see FIG. 2) are not provided. Therefore, the first heat generating portion 121 and the second heat generating portion 122 are both always connected to the power supply 16, and the power source voltage is equal to the applied voltage, i.e., the driving voltage of each of the heat generating portions 121, 122.

Figure 11:
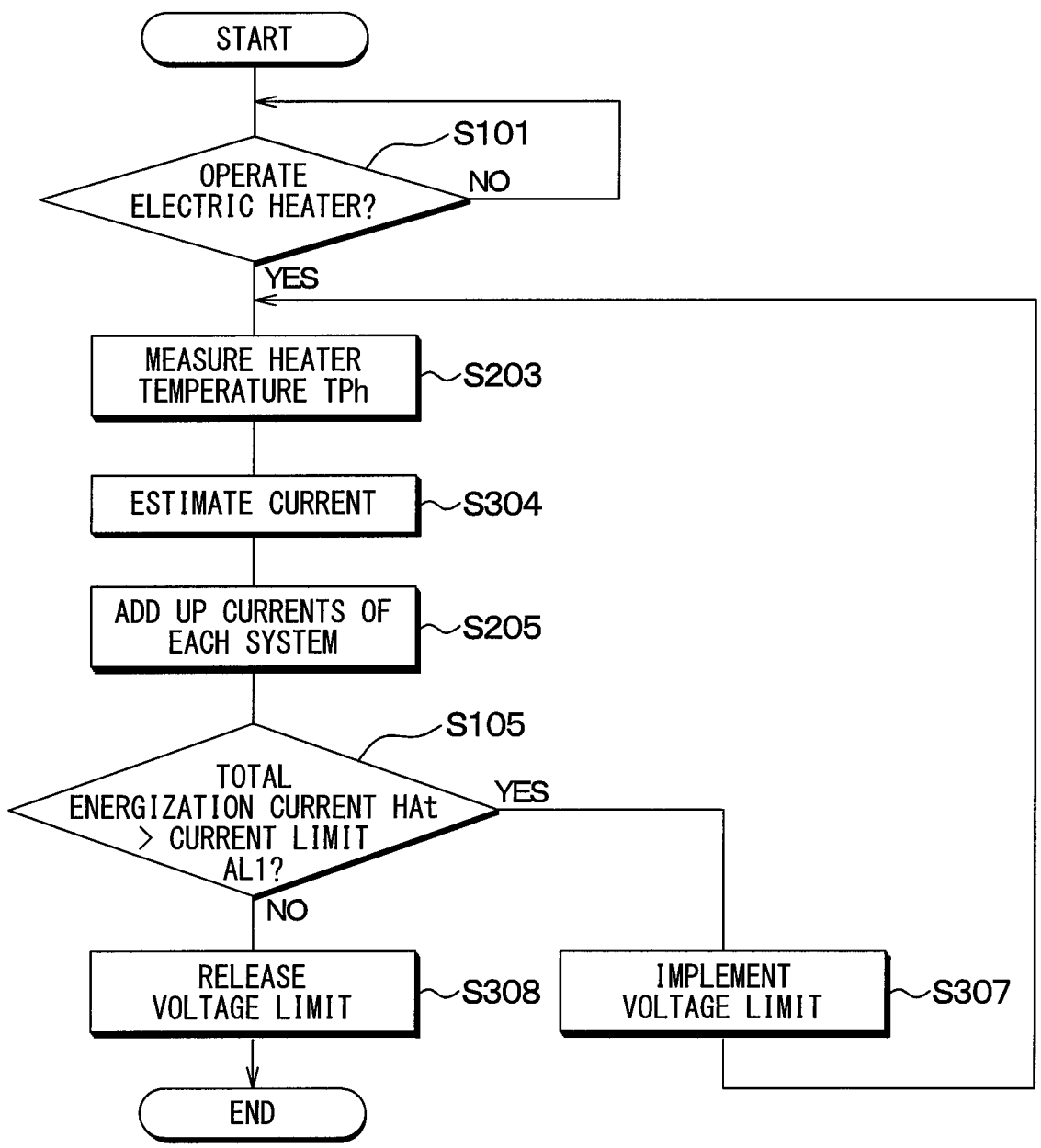
FIG. 11 is a flowchart showing a control process executed by a heater control device, and corresponds to FIG. 9.

The heater control device 14 of the present embodiment executes the control process shown in FIG. 11 instead of the control process shown in FIG. 9 of the second embodiment. Specifically, as in the second embodiment, the heater control device 14 of the present embodiment starts the control process of FIG. 11 when, for example, the ignition switch of the vehicle is turned on. Further, steps S101, S203, S205, and S105 of FIG. 11 are the same as the steps of the same reference numerals in FIG. 9, respectively.

In step S101 of FIG. 11, when the heater control device 14 determines that the electric heater 12 is to be operated, the process continues to step S203. After execution of step S203, the process continues to step S304. Conversely, in step S101, if the heater control device 14 determines that the electric heater 12 should be stopped, the processing of step S101 is repeated.

In step S304, the heater control device 14 estimates by calculating the current value of each of the heat generating portions 121, 122 for when the voltage is applied to each of the heat generating portions 121, 122 in the above described unrestricted state. That is, the heater control device 14 estimates by calculating the current value of each of the heat generating portions 121, 122 for when the steady voltage Vc is applied to each of the heat generating portions 121, 122. As in the second embodiment, each of the heat generating portions 121, 122 has the temperature characteristic shown in FIG. 3. Accordingly, the heater control device 14 stores the temperature characteristic of FIG. 3 as a resistance-temperature map.

Then, the heater control device 14 obtains the electric resistance of each of the heat generating portions 121, 122 from the resistance-temperature map, and based on this electric resistance and the steady voltage Vc, the heater control device 14 calculates the current value of each of the heat generating portions 121, 122. In FIG. 11, after step S304, the process continues to step S205.

In step S205 of FIG. 11, the heater control device 14 estimates the total energization current value HAt in the same manner as in step S205 of FIG. 9. In other words, the heater control device 14 calculates the total energization current value HAt as the sum of the current values of each of the heat generating portions 121, 122 obtained in step S304 of FIG. 11. In FIG. 11, after step S205, the process continues to step S105.

In step S105 of FIG. 11, if it is determined that the total energization current value HAt exceeds the current limit value AL1, the process continues to step S307. Conversely, if it is determined that the total energization current value HAt is equal to or less than the current limit value AL1, the process continues to step S308.

Here, a time chart when the heater control device 14 executes the control process of FIG. 11 is shown in FIG. 10. In the time chart of FIG. 10, the time point at which the energization of each heat generating portion 121, 122 is started at step S307 of FIG. 11 due to the determination at step S105 is shown as the time point ta1. Further, in FIG. 10, the time point ta2 shows the point in time at which the opposite determination is made at step S105 and the energization of each heat generating portion 121, 122 is started in step S308 of FIG. 11.

During step S307 of FIG. 11, the heater control device 14 performs a voltage limit control which energizes the first heat generating portion 121 and the second heat generating portion 122 while limiting the voltage applied to the first heat generating portion 121 and the second heat generating portion 122 as compared to the above described unrestricted state. Here, limiting the applied voltage as compared with the unrestricted state means, to put it simply, to set the applied voltage lower than the steady voltage Vc.

Further, if the voltage limit control is already being executed, execution of the voltage limit control is continued. This voltage limit control is continued until a voltage non-limiting control is started in step S308.

Specifically, in the voltage limit control of step S307, unlike the first heater control of the second embodiment, the energization to each of the heat generating portions 121, 122 is not turned ON and OFF. Instead, each of the heat generating portions 121, 122 is continuously energized. Then, the heater control device 14 limits the power supply voltage so that the current value of the electric heater 12 is equal to or less than the current upper limit ALu. For example, the power supply voltage may be determined based on the electrical resistance of each of the heat generating portions 121, 122 obtained in step S304.

Further, as shown in FIG. 10, the heater temperature TPh rises with the lapse of time from the time ta1 to the time ta2, and the electric resistance of each of the heat generating portions 121, 122 increases as the heater temperature TPh increases. Therefore, in the voltage limit control, as the heater temperature TPh rises, the applied voltage (that is, the driving voltage) of each of the heat generating portions 121, 122, which is equal to the power supply voltage, is increased to approach the steady voltage Vc. In FIG. 11, after step S307, the process continues to step S203.

In step S308 of FIG. 11, the heater control device 14 executes the voltage non-limiting control which applies the power supply voltage to each of the heat generating portions 121, 122 in the unrestricted state. That is, in the voltage non-limiting control, the heater control device 14 releases the limitation on the voltage applied to each of the heat generating portions 121, 122 implemented in the voltage limit control, and continuously energizes each of the heat generating portions 121, 122 by applying the steady voltage Vc of the power supply 16. Further, if the voltage non-limiting control is already being executed, execution of the voltage non-limiting control is continued.

After the time point ta2 in FIG. 10, due to the application of the voltage non-limiting control, the voltage applied to each of the heat generating portions 121, 122 is constant at the steady voltage Vc and the temperature of each of the heat generating portions 121, 122 is also constant. Accordingly, the current values of the heat generating portions 121, 122 are also constant.

As described above, after the energization of the electric heater 12 is started, the voltage limit control and the voltage non-limiting control are sequentially executed as the heater temperature TPh increases. Therefore, the current value of each of the plurality of heat generating portions 121, 122 is always maintained to be slightly less than half of the current upper limit ALu as indicated by the dashed line La in FIG. 10. As a result, the current value of the electric heater 12, which is the sum of the current value of the first heat generating portion 121 and the current value of the second heat generating portion 122, is always maintained at a value which is equal to or lower than the current upper limit ALu and also close to the current upper limit ALu, as shown by the line Lb. Due to this, the current load on the current circuit for energizing the electric heater 12 is appropriately reduced.

Further, similar to the second heater control of the second embodiment, in the voltage non-limiting control of the present embodiment as well, this voltage non-limiting control is continued until the electric heater 12 is turned off, for example, by switching the heater operation switch or an ignition switch. Then, once the electric heater 12 is turned off, the control process in FIG. 11 starts from step S101.

Note that steps S307 and S308 in FIG. 11 correspond to the energization control unit, and steps S203, S304, S205, and S105 correspond to the current determination unit.

Aside from the above described aspects, the present embodiment is the same as the second embodiment. Further, in the present embodiment, effects similar to those of the second embodiment described above can be obtained in the same manner as in the second embodiment.

Other Embodiments (1) In the above-described first embodiment, the electric heater 12 has two heat generating portions 121, 122, and in the first heater control executed in step S102 of FIG. 6, the heater control device 14 alternately energizes the first heat generating portion 121 and the second heat generating portion 122. However, this is only an example.

For example, the electric heater 12 may have three or more heat generating portions that are electrically connected in parallel to each other. Even when the electric heater 12 has three or more heat generating portions as described above, the first heater control may be executed in the same manner as in the above-described first embodiment. Furthermore, in the case where the electric heater 12 has three or more heat generating portions, during the execution of the first heater control, one of the heat generating portions of the electric heater 12 may be continuously in the on state as well.

In short, in the first heater control, it is acceptable as long as the heater control device 14 energizes the electric heater 12 while switching among a subset or all of the heat generating portions of the electric heater 12 those to be switched to the non-energizable off state. That is, as long as the current value of the electric heater 12 is suppressed to be equal to or lower than the upper limit current ALu, it is not necessary for all heat generating portions of the electric heater 12 to be duty limited. This similarly applies to the second embodiment discussed above.

Furthermore, in the third embodiment as well, the electric heater 12 may have three or more heat generating portions. Then, in step S307 of FIG. 11, as long as the current value of the electric heater 12 is suppressed to be equal to or less than the current upper limit ALu, it is not necessary that the applied voltage of all heat generating portions of the electric heater 12 to be lower than the steady voltage Vc. That is, it is fine as long as the applied voltage of any heat generating portion among all heat generating portions of the electric heater 12 be set to lower than the steady voltage Vc.

(2) In each of the above-described embodiments, as shown in FIG. 1, the electric heater 12 is configured as a single device. However, the electric heater 12 may form a portion of a larger planar heater device as well.

For example, in such a heater device, it is conceivable that the heater device is divided into a plurality of heater regions, and a subset of the plurality of heater regions is selectively heated. That is, it is conceivable that any one of the plurality of heater regions can be selected by an occupant or the like as a heat generation region that generates heat. In that case, the electric heater 12 of each of the above-described embodiments, in other words, the electric heater 12 to which the control processing of FIG. 6 or 9 is applied, corresponds to that heat generation region. Therefore, the plurality of heat generating portions 121, 122 of the electric heater 12 do not correspond to all the heat generating portions included in the heater device, but correspond to the heat generating portions included in the heat generating region.

(3) In the first embodiment, the current value of each of the heat generating portions 121, 122 is detected in step S103 of FIG. 6. Regarding this, the current value of each of the heat generating portions 121, 122 may be directly detected, or may be indirectly detected based on a physical value such as a current value detected at a location other than each of the heat generating portions 121, 122.

(4) In the first embodiment described above, at step S103 of FIG. 6, for the one of the first and second heat generating portions 121, 122 which is in the non-energizable OFF state during the processing of step S103, the current value of that heat generating portion prior to the OFF state is used as a current value for estimating the total energization current value HAt. However, this is merely an example. For example, the heat generating portion in the OFF state may be momentarily switched to the ON state, and its current value during the momentary ON state may be used as the basis for estimating the total energization current value HAt. In this regard, since the heat generating portion in the OFF state is momentarily switched to the ON state, even if the current value of the electric heater 12 momentarily exceeds the current upper limit ALu, the current interrupting circuit 161, which is a fuse, does not cut off the connection between the power supply 16 and the electric heater 12.

(5) In the above-described second embodiment, the flowchart of FIG. 9 includes steps S202 and S204, but steps S202 and S204 are not essential.

For example, if the voltage of the power supply 16 is maintained at a constant value, or maintained within a predetermined range that can be regarded as a constant voltage, it is possible to treat the applied voltage of each heat generating portion 121, 122 as a constant. In that case, it would be easy to provide in advance a map of the relationship between the heater temperature TPh and the total energization current value HAt from the temperature characteristics of FIG. 3. Then, in step S205, the heater control device 14 may estimate the total energization current value HAt from this map based on the heater temperature TPh. In this way, steps S202 and S204 would be unnecessary in the flowchart of FIG. 9.

Further, in the flowchart of FIG. 9, a configuration without steps S203 and S204 may be considered.

For example, in the case where the heat generating portions 121, 122 do not have the temperature characteristic as shown in FIG. 3, and instead the electric resistance of each of the heat generating portions 121, 122 is substantially constant regardless of the heater temperature TPh, their electric resistance can be regarded as a constant. In that case, it would be easy to provide in advance a map of the relationship between the applied voltage of each heat generating portion 121, 122 and the total energization current value HAt. Then, in step S205, the heater control device 14 may estimate the total energization current value HAt from this map based on the applied voltage of each heat generating portion 121, 122. In this way, steps S203 and S204 would be unnecessary in the flowchart of FIG. 9.

(6) In the second embodiment described above, in step S202 of FIG. 9, the applied voltage of each of the heat generating portions 121, 122 is detected. Regarding this, the applied voltage of each of the heat generating portions 121, 122 may be indirectly detected based on other physical values such as voltages other than the applied voltage. That is, in the control processing of FIG. 9, for example, estimating the total energization current value HAt based on the applied voltage includes estimating the total energization current value HAt based on a physical value corresponding to the applied voltage. This also applies to the detection of the heater temperature TPh.

(7) As shown in FIG. 10 of the third embodiment described above, between time point ta1 and time point tat, during the voltage limit control, as the heater temperature TPh rises, the applied voltage of each of the heat generating portions 121, 122 (i.e., the drive voltage) is also increases, but this is an example. In the voltage limit control, as long as the voltage applied to each of the heat generating portions 121, 122 is limited such that the current value of the electric heater 12 is equal to or less than the current upper limit ALu, the applied voltage may be fixed at a predetermined value (for example, half of the steady voltage Vc) instead.

(8) In each of the above embodiments, the processing of each step shown in the flowcharts of FIGS. 6, 9, and 11 is implemented by a computer program, but this processing may be implemented by hard logic as well.

The above described embodiments are not intended to be exhaustive or to limit the present disclosure. The present disclosure is intended to cover various modification and equivalent arrangements. Individual elements or features of a particular embodiment are not necessarily essential unless it is specifically stated that the elements or the features are essential in the foregoing description, or unless the elements or the features are obviously essential in principle.

A quantity, a value, an amount, a range, or the like, if specified in the above described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

Conclusion

According to a first aspect indicated in part or by all of the above embodiments, when it is determined that the total energization current value exceeds the current limit value, the energization control unit executes the first heater control. In the first heater control, the energization control unit energizes the electric heater while switching, among any or all of the heat generating portions of the electric heater, those to be turned to the non-energizable off state. Further, when it is determined that the total energization current value is equal to or less than the current limit value, the energization control unit executes the second heater control. In the second heater control, the energization control unit energizes all of the plurality of heat generating portions to energize the electric heater.

According to the second aspect, the electric resistance of the plurality of heat generating portions increases as the electric heater increases in temperature. Further, the energization control unit executes the second heater control when the electric heater is at a high temperature as compared with the case of executing the first heater control. Accordingly, when the electric heater is energized, the second heater control is executed after the electric resistance of the heat generating portions is increased due to the heat generated by the plurality of heat generating portions themselves. Accordingly, the current of the electric heater can be appropriately regulated.

According to a third aspect, the current determination unit estimates the total energization current value based on the temperature of the electric heater. Therefore, even if temperature changes in the electric heater influence the current values of the plurality of heat generating portions, it is possible to properly estimate the total energization current value.

According to a fourth aspect, the current determination unit estimates the total energization current value based on the applied voltage to the plurality of heat generating portions. Therefore, even if changes in the applied voltage influence the current values of the plurality of heat generating portions, it is possible to properly estimate the total energization current value.

Further, according to a fifth aspect, the current determination unit estimates the total energization current value by adding up current values detected during energization of each of the plurality of heat generating portions. Therefore, by detecting the current values, it is possible to easily estimate the total energization current value.

Further, according to a sixth aspect, for the one of the heat generating portions which is in the off state at the time of determining whether or not the total energization current value exceeds the current limit value, the current determination unit uses the current value of that heat generating portion prior to the off state as a current value for estimating the total energization current value. Therefore, during the execution of the first heater control, it is possible to estimate the total energization current value without needing to switch on the heat generating portion that is in the off state when it is being determined whether or not the total energization current value exceeds the current limit value.

Further, according to a seventh aspect, when it is determined that the total energization current value exceeds the current limit value, the energization control unit limits the voltage applied to any or all of the plurality of heat generating portions to as compared with a predetermined state. Further, when it is determined that the total energization current value is equal to or less than the current limit value, the energization control unit releases the limit of the applied voltage.

The invention claimed is:

1. A heater control device that controls an electric heater which includes a plurality of heat generating portions that generate heat when energized and which radiates the heat of the plurality of heat generating portions, the heater control device comprising:
  a microcontroller that determines whether or not a total energization current value, which is a current value to be supplied to the electric heater when all of the plurality of heat generating portions are energizable, exceeds a predetermined current limit value; and when the microcontroller determines that the total energization current value exceeds the current limit value, executes a first switch circuit which energizes the electric heater while switching, among any or all of the plurality of heat generating portions, those to be turned to a non-energizable off state, and when the microcontroller determines the total energization current value is equal to or less than the current limit value, executes a second switch circuit which energizes the electric heater with all of the plurality of heat generating portions being energizable.

2. The heater control device of claim 1, wherein
the plurality of heat generating portions are configured to increase in electric resistance as the electric heater increases in temperature, and
the microcontroller executes the second switch circuit when the electric heater is at a high temperature as compared to when executing the first switch circuit.

3. The heater control device of claim 2, wherein
the microcontroller estimates the total energization current value based on a temperature of the electric heater.

4. The heater control device of claim 1, wherein
the microcontroller estimates the total energization current value based on an applied voltage of the plurality of heat generating portions.

5. The heater control device of claim 1, wherein
the microcontroller estimates the total energization current value by adding up current values detected during energization of each of the plurality of heat generating portions.

6. The heater control device of claim 5, wherein
the microcontroller is configured to, for the one of the plurality of heat generating portions which is in the off state at the time of determining whether or not the total energization current value exceeds the current limit value, use the current value of that heat generating portion prior to the off state as the current value for estimating the total energization current value.

7. A heater control device that controls an electric heater which includes a plurality of heat generating portions that generate heat when energized and which radiates the heat of the plurality of heat generating portions, the heater control device comprising:

a microcontroller that determines whether or not a total energization current value, which is a current value to be supplied to the electric heater when a voltage is applied to the plurality of heat generating portions in a predetermined state, exceeds a predetermined current limit value; and when the microcontroller determines that the total energization current value exceeds the current limit value, limit the voltage applied to any or all of the plurality of heat generating portions as compared to the predetermined state, and when the microcontroller determines that the total energization current value is equal to or less than the current limit value, release the limit on the applied voltage.

8. A heating system, comprising:
an electric heater which includes a plurality of heat generating portions that generate heat when energized; and
a heater controller coupled to the electric heater, the heater controller being programmed to:

determine whether an estimated total energization current value, which is a current value to be supplied to the electric heater assuming that all of the plurality of heat generating portions are energizable, exceeds a predetermined current limit value, when the heater controller determines that the total energization current value exceeds the current limit value, executes a first switch circuit which energizes the electric heater while switching, among any or all of the plurality of heat generating portions, those to be turned to a non-energizable off state, and when the heater controller determines that the total energization current value is equal to or less than the current limit value, executes a second switch circuit which energizes the electric heater with all of the plurality of heat generating portions being energizable.

* * * * *